United States Patent Office 3,284,370
Patented Nov. 8, 1966

3,284,370
ALUMINA SUPPORTED COPPER OXIDE-RARE EARTH OXIDE CATALYST COMPOSITIONS
Alan Frank Clifford, West Lafayette, Ind., and Joseph Jaffe, Berkeley, Calif., assignors to Monsanto Company, a corporation of Delaware
No Drawing. Filed Dec. 31, 1962, Ser. No. 248,299
8 Claims. (Cl. 252—462)

The disclosure contained in the present application should be taken in conjunction with our copending application for Letters Patent, Serial No. 77,267, filed December 21, 1960, and which is now abandoned. The novel catalysts which can be used for removing smog-forming materials from the exhaust gases of internal combustion engines are disclosed in part in said application, Serial No. 77,267. The present application is a continuation-in-part of said application, Serial No. 77,267, which was assigned to the same assignee as the present application.

The present invention relates to novel catalysts and to processes for preparing these catalysts. The present invention more particularly relates to novel oxidation catalysts for the combustion of impurities in gas streams. The present invention also more particularly relates to the catalytic oxidation of combustible or oxidizable gases and vapors. The present invention still further relates to novel catalysts which may be used in exhaust systems of internal combustion engines to aid in preventing or minimizing the discharge of carbon monoxide and noncombusted or partially-combusted products to the atmosphere. The present invention still further relates to processes for the partial or substantially complete removal of smog-forming materials from the exhaust gases of internal combustion engines.

It is well-known that when fuels burn in an automotive engine, such as an ordinary gasoline or diesel engine, combustion is relatively incomplete and a considerable portion of the fuel is discharged into the atmosphere in an unburned or partially-oxidized condition and constitutes a part of the mixture of exhaust gases formed by the operation of such automotive engines. The exhaust gases from these internal combustion engines contain a mixture of toxic agents such as carbon monoxide and other undesirable oxidizable materials such as hydrocarbons, both saturated and unsaturated, and oxygenated organic compounds, such as aldehydes and organic acids, which are present due to the aforementioned relatively incomplete combustion of the fuels. Recently, due in part to the increasing use of automobiles and the resulting increase in automobile traffic, air pollution from such exhaust gases, particularly in urban areas, has been aggravated. It has further become apparent that even relatively small concentrations of oxidizable hydrocarbons and oxygenated organic compounds in automobile exhaust gases are serious and significant contributors to the problem of smog-formation in certain cities and air pollution in urban areas in general.

The term "exhaust gases" as used herein is intended to mean the gas streams produced by the fuels burned in and during the operation of internal combustion engines such as diesel engines or the gasoline engines of automobiles which contain the aforedescribed mixture of carbon monoxide and oxidizable materials.

The term "start-up exhaust gases" as used herein is understood to mean the exhaust gases initially produced by internal combustion engines when such engines are at low temperatures of from 250° C. to 350° C. Such gases contain relatively large quantities of uncombusted or partially combusted fuels, representing as much as 50% of the fuel supplied to the engine.

The term "deceleration exhaust gases" as used herein is understood to mean the exhaust gases produced by internal combustion engines during conditions of deceleration and when such engines are idling. Such gases also contain appreciable quantities of uncombusted or partially combusted fuels, the quantities being in the same order of magnitude as that present in start-up exhaust gases. The amount of uncombusted, or partially combusted oxidizable materials in exhaust gases varies considerably, but such gases generally contain from 2% to 3% by volume of carbon monoxide and from 0.1% to 0.3% of a mixture of saturated and unsaturated hydrocarbons and oxygenated organic compounds, generally aldehydes and organic acids. The amount of such materials in exhaust gases will depend on the internal combustion engine and the conditions under which it is operated.

Internal combustion engines, such as gasoline engines normally run rich, that is with air fuel ratios too low for complete combustion of fuel under normal operating conditions. Thus, for example, during the normal cruising conditions of an automobile approximately 1% of 4% of the fuel supplied to the engine is discharged in the exhaust gases as unburned or partially combusted material in the form of the aforedescribed mixture. This amount increases from about 2% to 8% while the engine is idling and may be as large as 50% during start-up or under deceleration conditions.

One of the principal reasons for the large quantity of uncombusted and partially combusted fuel in exhaust gases during start-up conditions is the low temperature of the engine and it is well-known that high temperatures, e.g., temperatures above 350° C., which prevail after the engine has warmed up, result in some decrease in the aforementioned uncombusted and partially combusted fuel products in the exhaust gases. However, even at such higher temperatures, not enough oxygen or air is present to effect complete oxidation or combustion of the aforementioned products.

It has been proposed heretofore to purify or eliminate the afore-mentioned exhaust gases through the use of certain oxidation catalysts. Such catalysts have usually been placed in the exhaust line or pipe of internal combustion engines to contact a mixture of air and the exhaust gases of the engines for the purpose of catalytically oxidizing and thus removing the objectionable constituents in the exhaust gases. It also has been proposed heretofore to use certain specific oxidation catalysts in specially designed mufflers, so that the air would be mixed with the exhaust gases immediately prior to contacting such gases with the catalyst, the purpose of the air being to provide oxygen for the catalytic oxidation. One such typical "catalytic muffler" has been described in U.S. Patent No. 2,909,415, to Eugene Joules Houdry issued October 20, 1959. Unfortunately, the difficulty of providing a sufficiently active oxidation catalyst, which is operable under the wide variations in temperature and concentrations of oxidizable materials usually found in the aforementioned exhaust gases, has thus far prevented the adoption and use of oxidation catalysts and/or mufflers containing such catalysts on any significant scale.

Generally speaking, the oxidation catalysts heretofore disclosed for the foregoing purposes do not function or do not function efficiently at temperatures below 450° C. and such catalysts are generally ineffective to catalyze oxidation when contacted with start-up exhaust gases containing air at temperatures of from 250° to 350° C. during start-up conditions. The addition of air to the exhaust gases, although necessary to provide oxygen for catalytic oxidation of the exhaust gases, also usually lowers the temperature of the exhaust gases below 450° C.

It is one object of the present invention to provide novel catalysts and processes for preparing such catalysts.

It is also an object of the present invention to provide novel oxidation catalysts which are useful for the catalytic oxidation of combustible or oxidizable gases and vapors.

It is another object of this invention to provide novel and efficient oxidation catalysts which oxidize hydrocarbons and/or oxygenated organic compounds at low temperatures and are useful in the catalytic oxidation of toxic gases and vapors in the exhaust gases from internal combustion engines.

It is a further object of this invention to provide novel and efficient methods for the removal of toxic and objectionable constituents from the exhaust gases of internal combustion engines.

Still further objects and advantages of the present invention will become apparent from the following description and the appended claims.

The present invention provides novel oxidation catalysts comprising an activated porous metal oxide support or carrier having a mixture of a predominant amount of copper oxide and a minor amount of a rare earth metal oxide or a mixture of rare earth metal oxides on the surface of the activated porous metal oxide.

The present invention also provides catalysts of the kind described wherein the activated porous metal oxide has certain hereinafter defined physical properties. Such catalysts are capable of being used to substantially completely oxidize and remove the toxic and smog-forming gases and vapors from the exhaust gases of internal combustion engines.

The present invention is based in part on the discovery that a novel catalyst comprising an activated porous metal oxide having a mixture, preferably a uniform mixture, consisting essentially of a predominant amount of copper oxide and an oxide of one or more rare earth metals, preferably an oxide of one or more of the rare earth metals which are oxidizable to valences higher than the tervalent state, on the surfaces of the activated porous metal oxide is a highly active oxidation catalyst. Such catalyst is useful in a variety of oxidation or dehydrogenation processes of the type which will be generally apparent to those skilled in the art, but is particularly useful in effecting the oxidation or removal of the undesirable constituents of exhaust gases.

By the term "activated porous metal oxide" as used herein is meant a catalytically active, porous, refractory metal oxide, which has a definite crystalline structure and exhibits a well-defined X-ray diffraction pattern prior to activation. When activated, usually by heating at elevated temperatures, such metal oxide loses a substantial amount of its crystallinity and exhibits a definite but less clearly defined X-ray diffraction pattern than the corresponding catalytically inactive porous metal oxide.

In general, the oxides of metals of periodic group II, III, IV and VI of the periodic table and which form catalytically active porous metal oxides are suitable for inclusion in the catalysts of this invention. Catalytically active porous metal oxides which have been found to be particularly useful in the catalysts of the present invention are activated porous alumina, thoria, chromia, magnesia, zirconia, and berylia. Of these activated porous metal oxides, alumina, thoria and zirconia are preferred and alumina is particularly preferred.

It has presently been found that, when a mixture of air and the exhaust gases of internal combustion engine are contacted with the novel catalyst of this invention at a temperature in the range of from 250° to 950° C., substantially all of the undesirable oxidizable constituents are catalytically oxidized to carbon dioxide and water, thereby purifying the exhaust gases.

As is well-known in the art, in order for these aforedescribed porous metal oxides to have catalytic activity they must exist or be prepared, in a special form. Thus, for example, alumina is known to have several crystalline forms, including the so-called alpha, beta, gamma, eta, theta and chi alumina. Gamma alumina may generally be prepared by heating precipitated aluminum hydroxide or by decomposing an aluminum salt such as, for example, aluminum nitrate at a temperature of from about 800° F. (426° C.) to 1,000° F. (537° C.). It is also well-known that when gamma alumina is heated above about 2,100° F., it becomes successively chi alumina, kappa alumina, and finally becomes the trigonal crystalline oxide or alpha alumina which, without further processing, is catalytically inert. However, such alpha alumina may be made catalytically active, for example, by treatment with ammonium nitrate and nitric acid followed by calcination. It has presently been found possible however, to use any of the aforementioned catalytically active porous aluminas or other described activated refractory, porous metal oxides in the practice of the present invention.

The activated porous metal oxides which are particularly suitable for use in the catalysts of this invention vary with respect to pore volume and pore diameter and generally have a pore volume in the range of from about 0.1 to about 0.7 milliliter per gram and an average pore diameter in the range of from about 25 to about 400 Angstroms.

One group of activated porous metal oxides which have been found particularly useful as a component or part of the catalysts of the present invention are characterized in having a pore volume of from about 0.2 to about 0.4 milliliter per gram and an average pore diameter of between about 70 and 90 Angstroms. Representative of such an activated porous metal oxide is, for example, a catalytically active chi alumina prepared as hereinafter described. Another group of activated porous metal oxides which have been particularly useful as a component or part of the catalysts of the present invention are characterized in having a pore volume of from about 0.35 to about 0.55 milliliter per gram and an average pore diameter of between about 50 to about 100 Angstroms. Representative of such an activated porous metal oxide is, for example, a catalytically active eta alumina. The measurement of pore size, including pore volume and pore diameter, in various porous materials is discussed in detail by C. L. Drake and H. L. Ritter in "Industrial and Engineering Chemistry," Analytical Edition, volume 17, pages 782–791 (1945). The methods described therein were essentially those employed in determining average pore diameters and other pore measurements of the catalytically active porous metal oxides employed in the catalysts of this invention. The preferred catalytically active porous metal oxides for use in the catalysts of the present invention have a specific surface area in the range of from about 5 to about 500 square meters per gram. One group of catalytically active porous metal oxides which are particularly preferred have a specific surface area of from 50 to 150 square meters per gram, preferably 80 to 120 square meters per gram, as measured by the method of Brunauer, Emmet and Teller, described in "Advances in Colloid Science," volume I, pages 1–36 (1932), published by Interscience Publishers, Incorporated, New York, N.Y. Another group of preferred catalytically active porous metal oxides are characterized in having a specific surface area of about 300 to about 400 square meters per gram as measured by the above-described method. Representative of such an activated porous metal oxide is, for example, a catalytically active eta alumina.

One of the activated porous metal oxides which is used in a preferred embodiment of the catalyst of this invention is a catalytically active chi alumina, prepared by the controlled calcination, preferably 450° C. to 550° C. of alpha alumina trihydrate. During the calcination procedure, the loss of water with the accompanying alumnia re-crystallization creates many large pores and usually results in a porous, catalytically active, chi alumnia which has the following characteristic X-ray (filtered Cu-K Radiation) diffraction pattern $d$-values and relative intensities, where 10 denotes the most intense diffraction.

| $d$-Values | Relative intensity |
|---|---|
| 2.4 | 4 |
| 2.27 | 2 |
| 2.11 | 3 |
| 1.98 | 2 |
| 1.53 | 1 |
| 1.39 | 10 |

The porous chi alumina, prepared as described, is characterized in having a pore volume of from 0.25 to 0.35 milliliters per gram, a specific surface area of from 90 to 100 square meters per gram and an average pore diameter of between 70 and 90 Angstroms.

One of the activated porous metal oxides which is used in another preferred embodiment of this invention is a catalytically active eta alumina prepared by the controlled calcination of bayerite, a beta aluminum trihydrate, at temperatures in the range of from about 500° F. (260° C.) to about 1,200° F. (649° C.). The conditions for preparing the porous eta alumina are preferably so controlled as to produce a product having a pore volume of 0.35 to 0.55 milliliter per gram and an average pore diameter of between about 50 and about 100 Angstroms and a specific surface area of from about 300 to about 400 square meters per gram.

As stated heretofore, a mixture of copper oxide and certain rare earth metal oxides preferably those of the ceria group of rare earth metal oxides (for example, cerium, praseodymium, neodymium and samarium) and europium oxides, (of the terbium group) or a mixture of copper oxide and mixtures of such rare earth metal oxides, are deposited or incorporated on the surfaces of any of the activated porous metal oxides to provide the novel catalysts of this invention.

The mixtures of copper oxide and rare earth metal oxides may be deposited or incorporated on the surface, including the surfaces within the pores, of any of the above-mentioned activated porous metal oxides in a variety of ways. For example, an activated porous metal oxide may be treated, or contacted with a dispersion of copper oxide and one or more of the rare earth metal oxides, hereindescribed, in a volatile organic liquid such as methanol, ethanol or acetone which organic liquid is then evaporated from the porous metal oxide. The activated porous metal oxides may also be separately treated with a dispersion of copper oxide in a volatile organic liquid and a dispersion of one or more of the rare earth metal oxides in a volatile liquid, in any order. However, there is no advantage in these separate treatments and a single treatment of a dispersion containing a mixture of copper oxide and one or more of the rare earth metal oxides is preferred.

Another and a preferred method of incorporating the mixture of copper oxide and one or more of the rare earth metal oxides on the surface of an activated porous metal oxide comprises heating such porous metal oxide with mixtures of copper salts and one or more rare earth metal salts, which salts are thermally convertible to copper oxide and rare earth metal oxides, at a temperature above the melting point of such salts.

Still another, and a particularly preferred method for incorporating a mixture of copper oxide and one or more of the rare earth metal oxides on the surface of an activated, porous metal oxide, comprises treating or contacting an activated, porous metal oxide, preferably an activated porous alumina, most suitably in granular or spherical form, with an aqueous solution containing a water-soluble, thermally decomposable copper salt, preferably copper acetate or copper nitrate, and a water-soluble thermally decomposable rare earth metal salt preferably praseodymium acetate or praseodymium nitrate. In some instances, it may be desirable to repeat the treatment several times, for example, 1, 2 or 3 times. The resultant mixture is thereafter heated to a temperature sufficient to evaporate the water and to convert the copper and rare earth metal salts to oxides, the temperature for carrying out such conversion preferably being within the range of about 250° C. to 950° C. There is thus provided a granular catalyst comprising an activated porous metal oxide having a uniform mixture of copper oxide and a rare earth metal oxide as described herein on the surface of the porous metal oxide.

Although any thermally decomposable copper and rare earth metal salts may be used in the preparation of the catalysts of this invention, including formate, acetate and nitrate salts, the nitrate salts are particularly preferred.

The activated porous metal oxides may be treated or contacted with any of the aforementioned solutions of copper salts and rare earth metal salts or mixtures thereof in a variety of ways such as, for example, by suspending any of the catalytically active porous metal oxides in the solutions to form a dispersion or slurry of the catalytically active metal oxide in the solutions or, for example, spraying the solutions of copper and rare earth metal salts or mixtures thereof on the surface of the activated porous metal oxide. The last mentioned method is preferably carried out by spraying the solution or solutions on the surfaces of particles or granules of porous metal oxide particles as the particles or granules are subjected to mechanical movement or agitation such as, for example, by tumbling the granules in a confined area during the spraying operation.

The amount of copper oxide, in the mixture of copper oxide and one or more of the rare earth metal oxides on the activated porous metal oxide may vary to some extent but is generally from about 1 to about 20 parts by weight, usually an amount of from about 10 to 20 parts by weight, of copper as copper oxide per 100 parts by weight of the activated porous metal oxide. In certain instances and particularly where the porous metal oxide has the higher surface area, pore volumes and average pore diameters hereinbefore described, it is possible to have amounts of copper below 10 parts by weight and a general range which is usually applicable is about 3 to 20 parts by weight. However, in a preferred catalyst of this invention a range of about 3 to about 8 parts by weight of copper on the above basis is particularly suitable. In all of the instances referred to above the copper oxide is usually in the form of cupric oxide, but may also be in the form of cupric and cuprous oxides.

The amount of rare earth metal oxides in the mixture of copper oxide and one or more of the herein-described metal oxides (which mixture is deposited on the surface of the rare earth metal oxide) is a minor amount usually from about 0.05 to about 0.9 part by weight, preferably about 0.05 to 0.4 part by weight, of rare earth metal in the form of the oxide thereof per 100 parts by weight of the activated porous metal oxide. In certain instances and particularly when the porous metal oxide has the higher surface area, pore volumes and pore diameters hereinbefore described, it is possible to have amounts of one or more rare earth metals in the form of oxides, above 0.4 part by weight and a general range which is usually applicable is about 0.4 to 0.9 part by weight. However, in a preferred catalyst of this invention a range of from about 0.4 to 0.6 part by weight of a rare earth metal on the above basis is particularly suitable.

In all of the above instances, the rare earth metal oxides which are preferred components of the catalysts of this invention usually exist in one or more oxide forms. For example, praseodymium, terbium, neodymium, cerium and dysprosium generally form tervalent oxides which are further oxidizable to valences higher than the tervalent state. By way of specific example praseodymium may form oxides wherein it has a valence of 3, 4 or 5, and can exist in three oxide forms, e.g., $Pr_2O_3$, $PrO_2$ and $Pr_6O_{11}$, but the praseodymium is usually present as the valence 3 metal oxide. Also by way of specific example cerium can exist in corresponding oxide forms, for example, $Ce_2O_3$, $CeO_2$ and $Ce_6O_{11}$ and the cerium is usually present as the valence 3 metal oxide.

The catalysts of this invention, prepared as above-described, may be used as oxidation or dehydrogenation catalysts in a number of processes such as "cracking" and refining processes in the petroleum industry as well as in the oxidation of oxidizable toxic and smog-forming materials in the exhaust gases of internal combustion engines.

The aforedescribed catalysts of this invention may be prepared in a number of physical forms or shapes as, for example, powders, coarse or fine granules, extrusions, spheres, tablets, pellets and the like, but are preferably prepared in the form of spheres. The catalysts may be obtained in such physical forms by grinding, granulating, extruding, tableting or pelleting the prepared catalysts by methods heretofore used in the catalyst manufacturing art and known to those skilled in such art. Also, in some instances, the activated, porous metal oxide may be fabricated into the final physical form desired prior to the incorporation of the oxides of copper and one or more of the rare earth metals on the surface thereof as heretofore described.

The particular physical form or shape of the oxidation catalysts of this invention will generally depend on the environment in which the catalyst is to be used as well as the particular use intended. For example, when the catalyst is to be used to contact the exhaust gases of internal combustion engines, its shape will depend upon the receptacle in which the catalyst is to be placed. When the receptacle is in the form of an exhaust muffler such as, for example, the apparatus described in U.S. Patent No. 1,902,160, issued March 21, 1933, to Joseph C. W. Frazer et al., or the apparatus described in U.S. Patent No. 1,903,803, issued April 18, 1933, to Maurice E. Barker, or either of the catalytic type mufflers described in U.S. Patents Nos. 2,828,189 and 2,909,415, issued respectively on March 25, 1958, and October 20, 1959, to Enguene J. Houdry, it is desirable that the catalyst be in the forms of pellets (including spheres), tablets or granules and the granular and/or spherical forms of catalysts are particularly preferred. The size and shape of the catalyst pellets, spheres, granules or tablets may vary to some extent, but it is desirable that they be large enough, and be placed in such a manner, that packing will not occur and that the exhaust gases will readily pass through the catalyst and initimately contact the surfaces, including the surfaces of the pores of the catalyst.

In a preferred embodiment of this invention granular catalysts composed of irregularly shaped granules having an average width in the range of from $1/16$ and $1/32$ inch and an average length in the range of from $3/32$ to $7/32$ of an inch are particularly desirable for use in mufflers through which exhaust gases are exhausted to the atmosphere. In another preferred embodiment of this invention, catalysts composed of spherical or spheroidal pellets having a diameter in the range of about $1/2$ inch to a diameter such that all or substantially all of the pellets will be retained on a No. 12 mesh U.S. screen are especially useful in mufflers through which exhaust gases are exhausted to the atmosphere. In a particularly preferred embodiment the spherical pellets have diameters such that all or substantially all of the spheres will pass through a No. 5 mesh U.S. standard screen and all or substantially all of the pellets will be retained on a No. 8 mesh U.S. standard screen.

The activated porous metal oxides are obtained in granular form by crushing larger masses of inactive or unactivated porous metal oxides and screening the crushed material through a series of screens prior to activation of the porous metal oxide.

The activated porous metal oxides may be obtained in spherical form by first crushing and pulverizing larger masses of inactive or unactivated porous metal oxides and then forming spheres or spherical pellets from the pulverized material prior to activation of the porous metal oxide. This can be readily accomplished by any of a number of pelletizing methods well known to those skilled in the art.

It has generally been found desirable to prepare the catalysts of this invention by a process which comprises contacting an activated porous metal oxide in any of the forms or shapes hereinbefore described with an aqueous solution containing a water-soluble copper salt, preferably copper nitrate and a water-soluble salt preferably a nitrate salt of one or more of the hereinbefore described rare earth metals until the solution has substantially penetrated the pores of the activated porous metal oxides such as alumina. The resultant mixture is thereafter dried, preferably by heating at a temperature of from about 70° C. to 300° C., to form a product comprising an activated porous metal oxide having a uniform mixture of the aforementioned copper salt and salt of one or more of the aforementioned rare earth metals deposited on the surfaces within the pores and on the external surface of the porous metal oxides. This product may then be heated, preferably at temperatures in the range of from about 300° C. to about 900° C., until the copper salt and the salts of one or more of the rare earth metals have been converted to the corresponding oxides of these metals. Alternatively, the drying and conversion of the salts to oxides can be carried out in one heating operation, if desired. By so proceeding a catalyst is formed comprising an activated porous metal oxide having a uniform mixture of copper oxide and one or more of a rare earth metal oxide deposited on the surface of the porous metal oxide.

In a preferred embodiment of this invention a granular or spherical catalyst, useful in the oxidation of exhaust gases from internal combustion engines, is prepared by contacting a granular or spherical, activated, porous alumina, having a pore volume of from about 0.2 to about 0.4 milliliter per gram, a specific surface area of from 50 to 150 square meters per gram and an average pore diameter of between 70 and 90 Angstroms, with an aqueous solution containing copper nitrate and praseodymium nitrate until the solution has substantially penetrated the pores of the porous alumina. The resultant mixture is thereafter dried, preferably by heating at a temperature of from 70° C. to 300° C., to form a product comprising a porous alumina having an uniform mixture of copper nitrate and praseodymium nitrate deposited on the internal surfaces, i.e. the surfaces within the pores, and on the external surfaces of the porous alumina. This product is subsequently heated, preferably at a temperature in the range of from 300° C. to 900° C., until the copper nitrate and praseodymium nitrate have been converted to the corresponding oxides of these metals thereby forming a granular or spherical catalyst, comprising a porous alumina having a uniform mixture of copper oxide and praseodymium oxide deposited on the surface thereof.

In another preferred embodiment of this invention a catalyst having the utility described herein is prepared by contacting a granular or spherically shaped activated alumina having a pore volume of from about 0.35 to about 0.55 milliliter per gram, a specific surface area of from about 300 to about 400 square meters per gram and an average pore diameter of from about 50 to about 100 Angstroms, with an aqueous solution containing copper nitrate and cerium nitrate until the solution has substantially penetrated the pores of the porous alumina. The resultant mixture is then dried as above-described to form a product comprising a porous alumina having a uniform mixture of copper nitrate and cerium nitrate deposited on the internal surfaces and on the external surfaces of the porous alumina. The product is then heated, preferably at a temperature in the range of from about 300°

C. to 900° C., until the copper nitrate and the cerium nitrate have been converted to the corresponding oxides of these metals. There is thus formed granular or spherical catalyst particles consisting essentially of granules or spheres and comprising a porous alumina having a uniform mixture of copper and cerium oxides deposited on the surface thereof.

Although any porous alumina having the afore-described properties may be used in the catalysts of the present invention, it has been found preferable in one embodiment of the catalysts of this invention to use a commercially available chi alumina, for example, the chi alumina designated as F–10, which is commercially prepared as a catalytic alumina by the Aluminum Company of America, of Pittsburgh, Pennsylvania. Moreover, it is preferable to employ this alumina in the form of irregularly shaped granules having an average width of between 1/16 and 1/32 inch and an average length of between 3/32 and 7/32 inch. Alternatively, it has also been found preferable to use a commercially available eta alumina, for example, the eta alumina designated as KA–101 which is commercially prepared as a catalytic alumina by the Kaiser Aluminum Company of Newark, New Jersey. It is preferable to employ this alumina either in a granular form in which the granules have a size within the above-described range or in the form of spheres or spherical pellets having the diameters hereinbefore described.

The amount of copper nitrate and one or more of the rare earth metal nitrates in solutions which are employed in contacting the metal oxides may vary and will usually depend upon the amount of solution which it is desired to employ. Generally, the solutions may contain from about 25% to about 75% by weight of copper nitrate and from about 0.6% to about 4.0% by weight of one or more of the rare earth metal nitrates. The volume of the solution employed is desirably an amount which will be entirely absorbed by the porous metal oxide. Stated differently the volume of solution preferably should be from between about 90% to about 105% of the pore volume of the porous metal oxide.

Although the above solutions may be used to contact any porous metal oxide it has been found particularly desirable to contact the activated chi and eta aluminas hereinbefore described and in granular or spherical form with solutions containing copper nitrate and praseodymium nitrate or solutions containing copper nitrate and cerium nitrate in which the metal nitrates are present in concentrations in the above-described ranges.

Thus, for example, the amount of copper nitrate and praseodymium nitrate, in a solution which is used in contacting the porous chi or eta alumina, may vary to some extent depending upon the amount of solution which it is desired to use. However, it has been found particularly desirable to use a solution containing from 65% to 75% by weight of copper nitrate and from 0.6 to 1.2% by weight of praseodymium nitrate. It has also been found desirable to use an amount of this solution which will be entirely absorbed by the porous alumina. In other words, the preferred amount of solution is dependent to some extent upon the pore volume of the alumina. In one embodiment, wherein the porous alumina has a pore volume of between 0.3 and 0.4 milliliter per gram, it has been found desirable to contact from 30 to 40 parts by weight of the above solution with 100 parts by weight of the porous chi or eta alumina. The product thus formed is a damp, moist mass in which no liquid is ascertainable, and it is generally desirable to remove the absorbed water by evaporation, preferably by heating at a temperature of from 70° C. to 90° C. It may sometimes be desirable or advantageous to age the product for from about 2 to about 12 hours prior to drying to permit intimate contact of the solution with the porous metal oxide. The dried product may then be heated, as described above, at a temperature of from 300° C. to 900° C. until the copper nitrate and praseodymium nitrate has been decomposed to form copper and praseodymium oxides, which oxides are ceramically fused as a uniform mixture, on the surfaces of the granular or spherical, porous, chi or eta alumina, to produce an oxidation catalyst which is active over a wide range of temperature conditions, hereinafter defined, and which is useful in catalytically oxidizing and purifying the exhaust gases of internal combustion engines.

A preferred oxidation catalyst, prepared in accordance with the foregoing procedure, is a granular catalyst comprising a porous alumina having a pore volume of between 0.25 and 0.35 milliliter per gram, a specific surface area of from 90 to 110 square meters per gram, an average pore diameter of between 70 and 90 Angstroms and having a uniform mixture of from about 10 to 20, preferably from about 14 to 16, parts by weight of copper in the form of copper oxide and from about 0.05 to 0.04, preferably from about 0.08 to about 0.3, part by weight of praseodymium in the form of praseodymium oxide deposited on the surface of 100 parts by weight of the porous alumina.

In another embodiment of this invention a chi or eta porous alumina in the form of granules or spheres obtained as hereinbefore described is contacted with a solution containing from about 45% to 55% by weight of copper nitrate and from about 1.0% to about 4.0% by weight of cerium nitrate in an amount such that substantially all of the solution is absorbed by the porous alumina. The resulting damp moist mass comprising moist granules or spheres is then preferably aged for from about 2 to 10 hours after which it is dried, preferably by heating at a temperature of from about 70° C. to about 90° C. The dried granular or spherical product may then be heated, as previously described, at a temperature of from about 300° C. to about 900° C. until the copper nitrate and the cerium nitrate are decomposed to form copper and cerium oxides, which oxides are ceramically fused as a uniform mixture on the surfaces of the granular or spherical, chi or eta alumina which is active over a wide range of temperature conditions, hereinafter defined and which is useful in catalytically oxidizing and purifying the exhaust gases of internal combustion engines.

A preferred catalyst, prepared in accordance with the foregoing procedure, is a granular or spherical catalyst comprising a porous alumina having a pore volume of from about 0.35 to about 0.55 milliliter per gram, a specific surface area of about 300 to 400 square meters per gram and an average pore diameter of between about 50 to about 100 Angstroms and having a uniform mixture of from about 3 to about 8 parts by weight of copper in the form of copper oxide and from about 0.05 to about 0.9, preferably from about 0.4 to about 0.6, parts by weight of cerium in the form of cerium oxide on the surface of 100 parts by weight of the porous alumina.

The catalytic oxidation of the aforementioned undesirable elements in exhaust gases is preferably accomplished by placing a "bed" of the novel catalysts of this invention, in the form of pellets, spheres, tablets or granules, directly in the exhaust line of the engine whereby the exhaust gases are contacted with the catalyst as they pass through the exhaust line. As stated heretofore a variety of devices for holding or "supporting" oxidation catalysts in the exhaust lines of internal combustion engines have been previously described and have been referred to herein. Such devices have been variously designated as exhaust purifying apparatuses or catalytic exhaust mufflers and generally consist of a housing, usually an oval cylinder, which is capable of confining and supporting the catalyst bed. These devices also usually contain a means for introducing and mixing air with the exhaust gases prior to contact with the catalyst to provide the oxygen necessary for catalytic oxidation. The air is usually introduced into the exhaust line by means of an auxiliary air pump or venturi.

The catalysts of this invention may be placed in any such exhaust purifier or catalytic muffler. However, the catalysts preferably should be in spherical tablet, pellet or granular form, in order that the resistance to the passage of the mixture of air and exhaust gases be held to a minimum, and to avoid back pressure. The quantity of catalyst, and therefore the size of the muffler, may vary considerably depending upon the size of the internal combustion engine and the amount and rate of exhaust gases produced. For example, a 4 cylinder engine will require a smaller quantity of catalyst than a 6 or 8 cylinder engine. The quantity of catalyst usually required will also depend upon the amount and rate of the exhaust gases to be contacted therewith. Generally speaking, it has presently been found that one value of the catalysts of this invention will catalytically oxidize from 10,000 to 40,000 standard volumes of exhaust gas per hour for periods ranging from 150 to 300 hours of engine operation. Stated differently, it is possible with the catalysts of the present invention to catalytically oxidize from 85% to 100% of the hydrocarbons and oxygenated organic materials such as aldehydes and ketones and more than 90% of the carbon monoxide present in the exhaust gases of internal combustion engines, such as, for example, automobile engines, for from 6,000 to 12,000 miles of operation and, in some instances, for a greater number of miles.

In one preferred embodiment of this invention, it has been found desirable to contact exhaust gases containing from 9% to 28% by volume of air, and which also contain from 0.1% to 0.3% by volume of hydrocarbons, and oxygenated organic materials such as aldehydes and ketones, and from between 1% to 3% by volume of carbon monoxide, with a catalyst of this invention at a temperature in the range of from 250° C. to 950° C. One catalyst used preferably comprises a porous granular or spherically pelleted alumina having a pore volume of from 0.25 to 0.35 milliliter per gram as specific surface area of from 90 to 110 meters per gram, an average pore diameter of between 70 and 90 Angstroms and generally has a uniform mixture of from about 14 to 16 parts by weight of copper in the form of copper oxide and from about 0.08 to about 0.3 part by weight of praseodymium in the form of praseodymium oxide, deposited on the surface of each 100 parts by weight of the porous alumina. The catalyst may be in any form, but is preferably a granular catalyst which is also usually composed of irregularly shaped granules having an average width of between $1/16$ and $1/32$ inch and an average length of between $3/32$ and $7/32$ inch. Under the above conditions, it has been found possible to contact from 10,000 to 40,000 standard volumes of the exhaust gas containing the aforementioned amounts of undesirable constituents with 1 equivalent volume of the above catalyst for periods up to 250 hours, before the catalyst becomes inefficient or inactivated. During this contact period the catalyst will generally remove from 85% to 100% of the organic materials and more than 90% of the carbon monoxide from the mixture of air and exhaust gas.

Another catalyst, which is prefered for use in the foregoing processes, comprises a porous granular or spherically pelleted alumina having a pore volume of from about 0.35 to about 0.55 milliliter per gram, an average pore diameter of between about 50 to about 100 Angstroms and a specific surface area of about 300 to about 400 square meters per gram and generally has a uniform mixture of from about 3 to about 8 parts by weight of copper, in the form of copper oxide and from about 0.05 to about 0.9 part of cerium, in the form of cerium oxide on the surface of 100 parts by weight of the porous alumina. The catalyst is preferably in the form of spheres having diameters within the ranges hereinbefore described. Such catalyst can be used to contact exhaust gases to remove organic materials and carbon monoxide as above described.

A further understanding of the catalysts and processes of the present invention will be obtained from the following examples which are intended to illustrate the invention but not to limit the scope thereof, parts and percentages being by weight unless otherwise specified.

Example I

Seventy-five parts of an aqueous solution containing 60% copper nitrate and 0.25% praseodymium nitrate, were mixed with 100 parts by weight of a granular, porous, chi alumina wherein the granules had an average width of $3/32$ inch and an average length of $7/32$ inch. The granular, porous, chi alumina was further characterized in having a pore volume of 0.3 milliter per gram, a specific surface area of 100 square meters per gram and an average pore diameter of about 85 Angstroms. The mixture was heated at a temperature of 75° C., during which time the solution completely impregnated the porous alumina, until all of the moisture was removed. The resultant dry mixture was then heated at a temperature of 500° C. for six hours at which time the copper nitrate and praseodymium nitrate had been converted to a mixed layer of copper oxide and praseodymium oxide, which layer was firmly adhered to all the surfaces, including the surfaces within the pores of the alumina. The catalyst so formed comprised a chi alumina having substantially the same pore volume, pore diameter and specific surface area as the untreated chi alumina, but which had a uniform mixture of 15 parts of copper, as copper oxide and 0.08 part of praseodymium, as praseodymium oxides impregnated on the surface of the aforementioned 100 parts by weight of porous alumina.

Example II

The procedure of Example I was repeated except that 100 parts of the chi alumina was mixed with 75 parts of an aqueous solution containing 60% copper nitrate and 0.5% praseodymium nitrate. The catalyst so produced was similar to the catalyst of Example I except that it contained a uniform mixture of 15 parts of copper as copper oxide, and 0.15 part of praseodymium oxide on 100 parts of the granular, porous, chi alumina.

Example III

The procedure of Example I was repeated except that 100 parts of a finely divided porous gamma alumina having a pore volume of 0.2 milliter per gram, a specific surface area of 70 square meters per gram and an average pore diameter of 75 Angstroms was used in place of the porous chi alumina.

The finely divided catalyst, containing a mixture of 15 parts by weight of copper in the form of copper oxide and 0.8 part by weight of praseodymium in the form of praseodymium oxide on the surface of the abovementioned 100 parts by weight of gamma alumina, was compressed into spherical pellets having a diameter of $3/8$ of an inch.

Example IV

The procedure of Example III was repeated except that 100 parts of the finely divided porous gamma alumina was mixed with 80 parts of solution containing 75% copper nitrate and 0.9% neodymium nitrate. The catalyst so produced comprised 100 parts of gamma alumina which contained a uniform mixture of 20 parts by weight of copper as copper oxide and 0.3 part by weight of neodymium as neodymium oxide on the surface of the gamma alumina.

Example V

The procedure of Example IV was repeated except that 100 parts of a finely divided porous activated thoria, having a pore volume of 0.2 milliter per gram and a specific surface area of 60 square meters per gram, was mixed with the solution of Example IV. The catalyst so produced was composed of 100 parts of thoria having a uniform mixture of 20 parts of copper in the form of copper oxide and 0.3 part of neodymium in the form of neodymium oxide on the surface of the thoria.

Example VI

An aqueous solution having a volume of 9.2 liters and containing 4.4 kg. of $Cu(NO_3)_2 \cdot 3H_2O$ and 354 grams $Ce(NO_3)_2 \cdot 6H_2O$ was sprayed, on 201 kilograms of a catalytically active spherically pelleted porous eta alumina. The eta alumina was characterized in having a pore volume of 0.5 ml per gram, an average pore diameter of 64 Angstroms and a specific surface area of 360 square meters per grams. The size of the spheres of the eta alumina was such that all of the spheres passed through a No. 6 mesh U.S. standard screen and all of the spheres were retained on a No. 8 mesh U.S. standard screen. The spraying operation was conducted using atomizers as the spherical pellets were tumbling, as a bed, in a rotating cylinder. The newly exposed surfaces in the bed of spheres provided by the tumbling were sprayed until the solution was exhausted.

The sprayed, spherical pellets were moist and were aged for 12 hours in a sealed container after which the spherical pellets were dried in an air circulating oven maintained at a temperature of 100° C. for about 1 hour until they were dry. The pellets consisted of spheres of porous eta alumina having a uniform mixture of copper nitrate and cerium nitrate deposited on the external surface and the surfaces within the pores of the eta alumina.

The pellets were then heated in an oven at 500° C. for five hours. The product so obtained consisted of a catalyst comprising a catalytically active porous eta alumina having the above-described surface characteristics and having a uniform mixture of 5 parts by weight of copper in the form of copper oxide and 0.5 part by weight of cerium in the form of cerium oxide impregnated on the surface of the above-mentioned 100 parts by weight of catalytically active porous alumina.

Example VII

A cylindrical tube, 18 inches long and having a diameter of 2 inches was placed in the exhaust line in such a manner as to receive two cubic feet per minute of the hereinafter defined exhaust gases of a 4 cylinder gasoline engine which, when operated at a speed of 1800 revolutions per minute produced an exhaust gas containing an amount of gaseous organic materials including hydrocarbons and oxygenated organic compounds, which ranged from 0.15% to 0.4% by volume, and also containing from between 2% to 3% carbon monoxide. The quantity of organic materials in the exhaust gas stream was measured by a Liston Becker, Model 15, non-dispersive infra-red analyzer sensitized with normal hexane. The carbon monoxide content of the exhaust gas stream was determined by Orsat analysis.

The forward nine inch portion of the tube was surrounded by nine inch long electrical resistance heater, whereby the temperature of the gases could be controllably heated within the range of from 250° C. to 950° C. just prior to contacting such gases with the catalyst bed, which was located nine inches in the rear portion of the tube. The forward portion of the tube also contained air inlet, into which controlled amounts of air could be pumped to provide an exhaust gas stream containing a range from 4% to 34% by volume of air, the air-exhaust mixture then being heated by the thermostatically controlled heater. The rearward 9 inch portion of the tube provided space for a 0.35 liter bed of catalyst. A continuous measurement of a mixture of exhaust gases containing 20% by volume of air demonstrated that the amount of gaseous organic materials present was in the range of from 0.1% to 0.3% by volume and that the amount of carbon monoxide was present in the range of 1% to 2% by volume during the operation of the 4 cylinder engine. The gases were continuously measured using the method heretofore described.

The catalyst of Example I was placed in the aforedescribed tube, connected in the exhaust line and 0.35 liter of above-mentioned catalyst was continuously contacted with the mixture of air and exhaust gases, (maintained at a temperature of between 270° to 300° C.) of the 4 cylinder engine, until the catalyst became exhausted. When significant quantities of gaseous organic materials, e.g. 0.05% by volume, and carbon monoxide, e.g. 0.5% by volume, appeared in the exhaust gas which had been contacted with the catalyst, the experiment was discontinued.

The 4 cylinder engine burned regular leaded fuel and the gas stream which had been contacted with the catalyst bed was continuously measured for organic materials such as hydrocarbons and organic oxygenated compounds by the aforedescribed infra-red procedure and for carbon monoxide by the Orsat apparatus.

The gas stream which contained a mixture of exhaust gases and 20% by volume of air, was continuously contacted with the catalyst bed for 150 hours or an equivalent of 6,000 miles of automobile operation before the catalyst became "exhausted," i.e. the exhaust gases after contact with the catalyst contained 0.05% by volume of gaseous organic materials and 0.5% by volume of carbon monoxide. Over the 150 hour operation period, the catalyst removed substantially all of the carbon monoxide and more than 85% of the above defined organic materials from the exhaust gases.

The exhaust gas was continuously generated at an hourly volume rate of 10,000 times the volume of the catalyst during the entire 150 hour period.

Example VIII

The procedure of Example VII was repeated except that the catalyst of Example II, containing twice the amount of praseodymium oxide as the catalyst of Example I was placed in the tube to form the catalyst bed in the exhaust line. The engine was operated for a period of 250 hours, equivalent to 10,000 miles of automobile operation, before the catalyst no longer removed a sufficient quantity of carbon monoxide and the aforementioned gaseous organic materials when contacted with the exhaust gases as above described.

Example IX

The procedure of Example VII was repeated except that the catalyst of Example VI comprising spheres of porous eta alumina having a uniform mixture of 5 parts by weight of copper, in the form of copper oxide and 0.5 part by weight of cerium, in the form of cerium oxide was placed in the tube to form the catalyst bed in the exhaust line. The engine was operated for a period of 250 hours, equivalent to 10,000 miles of automobile operation at which time the catalyst still removed substantially all of the carbon monoxide and more than 80% of the hereinbefore defined organic materials from the exhaust gases.

Example X

The catalyst of Example I was evaluated on a 1955 six cylinder Chevrolet under road test wherein the catalyst was placed in a commercial automobile catalytic muffler. During this test the catalyst removed 88% of the gaseous organic materials and 98% of the carbon monoxide from the exhaust gases of the Chevrolet engine.

Catalysts similar to the catalysts of Example I and II, but which contained no rare earth metal oxide, removed less than 50% of the hydrocarbons and carbon monoxide from the exhaust gas of the aforementioned 4 cylinder engine. Such catalysts generally became exhausted after 25 hours of continuous operation and thereafter failed to remove appreciable amounts of organic materials and carbon monoxide from the exhaust gas stream.

When the catalysts prepared in Examples III, IV and V, were evaluated in accordance with the procedure described in Example VII, such catalysts removed over 95% of the inorganic materials such as hydrocarbons and oxygenated organic compounds and more than 99% of the carbon monoxide gas from the exhaust gases for periods of over 100 hours of internal combustion engine operation.

The catalyst of Example VI was also evaluated on a 1955 six cylinder Chevrolet under road test conditions wherein the catalyst was placed in a catalytic automobile muffler. During this test the catalyst removed 91% of the gaseous organic materials and 98% of the carbon monoxide from the exhaust gases of the Chevrolet engine over the 5,000 mile test period.

What is claimed is:

1. A catalyst consisting essentially of a granular, catalytically active, porous alumina having a pore volume of from about 0.2 to about 0.4 milliliter per gram, a specific surface area of from 50 to 150 square meters per gram, an average pore diameter of between 70 and 90 Angstroms and having a uniform mixture of from 10 to 20 parts by weight of copper in the form of copper oxide and from 0.05 to 0.4 part by weight of praesodymium in the form of praesodymium oxide on the surface of 100 parts by weight of said granular porous alumina.

2. A catalyst according to claim 1, wherein the catalyst is composed of spherical pellets having diameters in a range such that substantially all of the pellets will pass through a No. 5 mesh U.S. standard screen and substantially all of the pellets will be retained on a No. 8 mesh U.S. standard screen.

3. A catalyst consisting essentially of a catalytically active, porous alumina having a pore volume of from about 0.2 to about 0.4 milliliter per gram, a specific surface area of from 50 to 150 square meters per gram, an average pore diameter of between 70 and 90 Angstroms and having a uniform mixture of from 10 to 20 parts by weight of copper in the form of copper oxide and from 0.05 to 0.4 part by weight of neodymium in the form of neodymium oxide on the surface of said porous alumina.

4. A catalyst consisting essentially of a catalytically active, porous chi alumina having a pore volume of from 0.25 to 0.35 milliliter per gram, a specific surface area of from 90 to 110 square meters per gram, an average pore diameter of between 70 and 90 Angstroms and having a uniform mixture of from about 14 to about 16 parts by weight of copper in the form of copper oxide and from about 0.08 to about 0.3 part by weight of praseodymium in the form of praseodymium oxide deposited on the surface of 100 parts by weight of said porous alumina, said catalyst being in the shape of pellets.

5. A catalyst consisting essentially of a catalytically active porous eta alumina having a pore volume of from about 0.35 to about 0.55 milliliter per gram, an average pore diameter of from about 50 to about 100 Angstroms and a specific surface area of from about 300 to about 400 square meters per gram and having a uniform mixture of from about 3 to about 8 parts by weight of copper in the form of copper oxide and from about 0.4 to about 0.6 part by weight of cerium in the form of cerium oxide deposited on the surface of 100 parts by weight of said porous alumina, said catalyst being in the form of spherical pellets.

6. A catalyst consisting essentially of a catalytically active, porous metal oxide selected from the group consisting of alumina and thoria, said porous metal oxide having a pore volume in the range of from about 0.1 to about 0.7 milliliter per gram, an average pore diameter in the range of from about 25 to about 400 Angstroms and a specific surface area of from about 5 to about 500 square meters per gram, and having substantially on the internal and external surfaces of said oxide a mixture of (a) from about 1 to about 20 parts by weight, based on 100 parts by weight of said porous metal oxide, of copper oxide and (b) from about 0.05 to about 0.9 part by weight, based on 100 parts by weight of said porous oxide, of a rare earth metal oxide selected from the group consisting of ceria group rare earth metal oxides, europium oxides, terbium oxides and dysprosium oxides, said rare earth metal oxide being oxidizable to valences higher than the tervalent state.

7. A catalyst consisting essentially of a catalytically active, porous alumina having a pore volume of from about 0.20 to about 0.40 milliliter per gram, an average pore diameter of from about 70 to about 90 Angstroms, a specific surface area of from about 50 to about 150 square meters per gram, and having substantially on the internal and external surface thereof a uniform mixture of (a) from about 3 to about 20 parts by weight, based on 100 parts by weight of said alumina, of copper oxide and (b) from about 0.05 to about 0.90 part by weight, based on 100 parts by weight of said alumina, of praseodymium oxide.

8. A catalyst consisting essentially of a catalytically active, porous alumina having a pore volume of from about 0.35 to about 0.55 milliliter per gram, an average pore diameter of between about 50 to about 100 Angstroms, a specific surface area of from about 300 to about 400 square meters per gram, and having substantially on the internal and external surface thereof a uniform mixture of (a) from about 3 to about 20 parts by weight, based on 100 parts by weight of said alumina, of copper oxide and (b) from about 0.05 to about 0.90 part by weight, based on 100 parts by weight of said alumina, of cerium oxide.

References Cited by the Examiner

UNITED STATES PATENTS

| | | | |
|---|---|---|---|
| 1,867,325 | 7/1932 | Neville | 23—2.2 |
| 1,871,117 | 8/1932 | Day | 252—462 X |
| 1,977,978 | 10/1934 | Wenzel | 23—2.2 |
| 2,071,119 | 2/1937 | Harger | 23—2.2 |
| 2,204,733 | 6/1940 | Miller | 252—462 X |
| 2,627,506 | 2/1953 | Hunter et al. | 252—463 |
| 2,942,932 | 6/1960 | Elliott | 23—2 |
| 2,943,065 | 6/1960 | Braithwaite | 252—463 |
| 2,945,057 | 7/1960 | McDaniel et al. | 252—462 X |
| 3,002,921 | 10/1961 | Gladrow et al. | 252—462 X |
| 3,024,593 | 3/1962 | Houdry | 23—2.2 |
| 3,025,132 | 3/1962 | Innes | 23—2 |

OTHER REFERENCES

Newsome et al., "Alumina Properties, Technical Paper No. 10, Second Revision," Aluminum Company of America, Pittsburgh, Pa. (1960), pp. 46, 58, 59.

Russell et al., "Alumina Properties, Technical Paper No. 10 (Rev.)," Aluminum Company of America, Pittsburgh, Pa. (1956), pp. 34, 44, 46.

Stein et al., "Catalytic Oxidation of Hydrocarbons," Industrial and Engineering Chemistry, vol. 52, No. 8, pp. 671–674, August 1960.

OSCAR R. VERTIZ, *Primary Examiner.*

MAURICE A. BRINDISI, BENJAMIN HENKIN,
*Examiners.*

E. C. THOMAS, G. T. OZAKI, *Assistant Examiners.*